US006278511B1

(12) United States Patent
Krupica et al.

(10) Patent No.: US 6,278,511 B1
(45) Date of Patent: *Aug. 21, 2001

(54) METHOD AND APPARATUS FOR STACKING AND DRYING CUT IMAGED MEDIA

(75) Inventors: Libor Krupica, Nashua, NH (US); Peter Austin, Wilmington, MA (US)

(73) Assignee: AGFA Corporation, Wilmington, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,580

(22) Filed: Dec. 30, 1998

(51) Int. Cl.[7] .......................... G03B 29/00; G03B 27/32; G03B 27/52; B41J 2/01; B41J 2/435

(52) U.S. Cl. ................................ 355/28; 355/27; 355/30; 355/74; 347/104; 347/264; 347/262; 347/153; 347/102

(58) Field of Search ................................ 355/27, 30, 74, 355/75, 28; 347/104, 264, 262, 153, 102

(56) References Cited

U.S. PATENT DOCUMENTS

| | | | | |
|---|---|---|---|---|
| 3,637,304 | | 1/1972 | Tiger et al. | 355/10 |
| 4,260,234 | * | 4/1981 | Burton | 354/319 |
| 4,872,033 | * | 10/1989 | Watanabe et al. | 355/27 |
| 5,091,281 | * | 2/1992 | Nakamura et al. | 430/203 |
| 5,374,972 | * | 12/1994 | Nakane et al. | 354/319 |
| 5,430,522 | * | 7/1995 | Kobayashi et al. | 355/27 |
| 5,537,178 | * | 7/1996 | Van Den Bergen et al. | 354/300 |
| 5,739,896 | * | 4/1998 | Patton et al. | 355/27 |
| 5,771,090 | * | 6/1998 | Verlinden et al. | 355/27 |
| 5,933,221 | * | 8/1999 | Shima et al. | 355/72 |

* cited by examiner

*Primary Examiner*—Russell Adams
*Assistant Examiner*—Khaled Brown
(74) *Attorney, Agent, or Firm*—Robert A. Sabourin; William Hilton

(57) ABSTRACT

A conventional imagesetting system includes an imagesetter for transferring an image onto media, a wet chemical processor for processing the imaged media, an enclosed dryer section for drying the media by circulating air thereabout, and extraction rollers for extracting the media from the enclosed dryer section. An improved imagesetting system further includes: an apparatus for drying and lifting the media after extraction from the enclosed dryer section by blowing air along an underside of the extracted media; a stacking surface for stacking the extracted, dried media, where the stacking surface is formed by one or more external surfaces of the imagesetter and the processor and the stacking surface has at least one sloped section; and an indent which extends the stacking surface beneath the extraction rollers in a direction opposite to a direction of movement of the media being extracted, so that the indent prevents binding of trailing edges of the media by accepting sections of the media which abut the trailing edges onto the stacking surface proximate to the indent.

18 Claims, 4 Drawing Sheets

METHOD AND APPARATUS FOR STACKING AND DRYING CUT IMAGED MEDIA

BACKGROUND OF THE INVENTION

This invention relates generally to the printing industry and more particularly to stacking of cut imaged sheets of photographic media in imagesetters and platesetters.

The following terms are defined for clarity throughout this disclosure and the appended claims. An "imagesetter" is defined as a high resolution output device that takes rasterized, bitmapped data, such as a digital text or image file, generated by a raster image processor and writes it to a medium such as film or paper, commonly using a laser that exposes the medium line by line. A "platesetter" is an imagesetter which transfers the image directly onto a printing plate. Hereinafter, the term "imagesetter" will be used to denote either an imagesetter or platesetter as defined above. A "medium" as defined herein is a substrate to which an image is transferred in a printing process, whether chemically, thermally, photographically or mechanically. Media can be made of a variety of substances such as, but not limited to, paper, film, polyester, rubber, plastic, aluminum and other various metals and combinations.

Two conventional imagesetting systems, which will be referred to in the following discussion, are illustrated in FIGS. 1, 2 and 3. A conventional imagesetting system includes a workstation, an imagesetter and a processor. The system is designed to: (1) acquire an image in digital format using any known image acquisition device such as a scanner or digital camera; (2) allow alterations to the acquired image through the use of a computer workstation and, typically, off-the-shelf software image editing packages; (3) transform the altered digital image into bitmapped data via a raster image processor (RIP); (4) transfer the bitmapped data by exposure onto a medium or substrate; and (5) chemically process the exposed medium to yield a finished product. The finished product is a developed film or printing plate.

Alterations of the acquired image, as well as control of the various components of the imagesetting system 100, are provided by operator use of a workstation 50 as shown in FIG. 1. Although not explicitly shown, the workstation 50 or its equivalent could be used with the imagesetting systems of FIGS. 2 and 3. The workstation or computer system 50 includes a central processing unit (CPU) 40 and a variety of peripheral devices such as a monitor 42, a keyboard 44, a mouse 112, a CDROM port 46 and floppy disk ports 48, 49. The monitor 42, keyboard 44, mouse 112 and floppy disk port 49 are each electronically connected to the CPU 40 via a bus 52 which, in turn, communicates to the imagesetter 102 and the processor 104 via lines 54 and 56, respectively. CDROM port 46 and floppy disk port 48 are also connected to the other system components via lines 52, 54 and 56. Of course, other combinations of peripherals and computer equipment could be used, if desired, to provide similar control functions of the computer system 50.

After the image is acquired and edited as desired, the altered digital image is transformed into bitmapped data in the raster image processor. In this example, the CPU 40 performs the raster image processing. Alternatively, a separate raster image processor could be used in conjunction with the workstation 50.

The bitmapped or rasterized data is then transferred to a medium which is exposed in an internal drum imagesetter 102 using a light source such as a laser.

The exposed medium is then chemically processed in the wet chemical processor 104, which develops, fixes and washes the medium. After chemical processing, the imaged medium is dried, output and stacked into the output basket 106 of the system 100 of FIG. 1, or onto the stacking surface 230 of the system 250 of FIGS. 2 and 3. An enclosed dryer section (not shown) is built into, or attached to, the processor 104 of FIG. 1 whereby air is circulated and blown across the chemically processed medium for drying. Similarly, the imagesetting system 250 of FIG. 2 includes an enclosed dryer section 212 in which preferably warm air is circulated to assist in drying the imaged media prior to stacking. The enclosed dryer section 212 can be considered either as a part of the processor 104, or as a separate system component.

In the imagesetting system 100 of FIG. 1, the processed sheets of medial 05, 107 and 108 are extracted from the processor 104 and collected or stacked into the basket 106. The imagesetting system 250 of FIG. 2 eliminates the need for a basket 106 by use of a redirecting section 224 which redirects the media to be extracted from the processor 104 for stacking onto the upper surface 230 of the system 250. The stacking surface 230 could be defined by either the imagesetter 102 alone, the processor 104 alone, or the combined imagesetter and processor 250 and optionally with a side wall 118 adjacent to the ends of 116 of stacked media 107. Removal of the basket 106 from the imagesetting system 100 shrinks the footprint, i.e. the space, needed for the system.

A typical imagesetting system includes three main components: (1) a raster image processor which translates file information of an acquired and edited image into a bitmap, at the resolution of the image recorder; (2) an image recorder which uses laser imaging to expose the bitmap image on the medium; and (3) a processor which develops the medium to create the finished product. The imagesetter outputs color separations including high resolution halftones and other graphics, as well as type. Film imaged on the imagesetter is used to prepare a set of black-and-white or color proofs using a commercially available proofer. It is the designer's responsibility to carefully check the quality and completeness of the proofs which indicate the results expected on the printing press.

One internal drum imagesetter similar to the imagesetter 102 is described in U.S. Pat. No. 5,769,301 issued Jun. 23, 1998 to Herbert et al. Another internal drum imagesetting system is described in U.S. Pat. No. 5,699,099 issued Dec. 16, 1997 to Garand et al. Both of the above patents are herein incorporated by reference in their entirety for non-essential background information which is helpful in appreciating the applications of the present invention.

Typically within the imagesetter 102, a media supply cassette supplies a roll of image-receiving media such as photographic film. Alternatively, photo-sensitive printing plates or strips of film could be supplied. A predetermined length of the media is placed onto an internal drum where a rasterized image is transferred onto the medium via a laser light source. The imaged medium is thereafter removed from the inner surface of the drum and transported to the image processor 104 for chemically developing, fixing, washing and perhaps drying the medium.

FIG. 3 is a side view of the imagesetting system 250 of FIG. 2, schematically illustrating the workflow of the wet image processor 104. Specifically, the imaged medium 200 passes into the processor 104 via transport rollers 204. This particular processor contains: a developer section 206; a fixer section 208; a dual wash section 210; and a dryer section 212 enclosed in a housing 224. Each section performs a basic function to change the exposed medium into a fully developed and dry medium, ready for handling. The imaged film is transported through the processor entrance slot 202 where the transport roller system controls the movement of the film at an uniform speed through each of the four sections. The transport roller system includes: numerous roller pairs 216 in the developer section 206; numerous roller pairs 218 in the fixer section 208; numerous roller pairs 220, 222, and 211 in the wash section 210; and numerous roller pairs 214 in the enclosed dryer section 212.

In the developer section 206 the latent image created during exposure is developed, and in the fixer section 208 the developing process is stopped and unexposed silver halide is dissolved.

In the wash sections 210 any residual chemicals are washed off the medium. Fresh water is added from an external water supply. Any excessive water overflow is drained through overflow/drain tubes.

In the imagesetting system 100 of FIG. 1, the cut, imaged, processed and dried medium 108 is extracted from the processor 104 and is fed via rollers 110 into a storage basket 106. In the imagesetting system 250 of FIGS. 2 and 3, the medium 108 is extracted from the enclosed dryer section 212 of the processor 104 through a slot 226 and is thereafter stacked on the flat, planar surface 230 of the imagesetter 102 and the processor 104.

SUMMARY OF THE INVENTION

One problem with the above-described imagesetting systems is the availability and cost of floor space. The imagesetters and processors are typically large machines having footprints which take up significant, valuable floor space.

Another problem is drying the processed, cut media. Sometimes the media does not dry adequately for stacking. After imaging, the image-carrying medium is chemically developed, fixed and washed in the wet processor. The media must be sufficiently dried prior to stacking, otherwise the cut media can streak, stick to one another, and cause slippery working conditions for the operator. The prior art teaches drying the media by using squeegee rollers for sponging moisture off the media, and by circulating warm air from a fan within the enclosed dryer section. However, these drying efforts alone are sometimes insufficient to provide a medium which is completely dried for stacking.

Another problem is stacking numerous pieces of cut imaged media on top of one another without scratching, marking or otherwise damaging each image thereon. In existing imagesetting systems, the leading edge of the exiting medium sheet will likely drag across one surface of the previously imaged medium sheet, potentially causing damage to both sheets. The same problem can occur when one sheet of medium is stacked onto a stacking surface and the leading edge of the currently exiting medium sheet is dragging across the previously extracted sheet of media.

Yet another problem is stacking the media flat and evenly on top of one another without any bending or air gaps between stacked sheets of the media. The weight of many stacked sheets can cause permanent deformation of the planar characteristics of the sheets if not stacked completely flat.

Another problem is preventing jamming or binding of either a leading edge or a trailing edge of the imaged medium during stacking. If the leading edge binds, the medium may not exit or stack properly. The trailing edge of a sheet of medium can potentially jam or bind, for instance, along the vertical surface of the enclosed dryer section cover, causing stacking problems, possible medium damage and limitation on the number of sheets which can be stacked before emptying the stacking bin.

Another problem is stacking media of different sizes for a single job.

Another problem is a limitation in the number of cut imaged sheets which can be consecutively stacked on top of one another due to any one of, or a combination of, the above problems.

The above-identified and other problems are solved by an imagesetting system which includes: an imagesetter for transferring an image onto media, a wet chemical processor for processing the imaged media, an enclosed dryer section for drying the media by circulating air thereabout; extraction rollers for extracting the media from the enclosed dryer section; an apparatus for drying and lifting the media after extraction from the enclosed dryer section by blowing air along an underside of the extracted media; a stacking surface for stacking the extracted, dried media, where the stacking surface is formed by one or more external surfaces of the imagesetter and the processor and the stacking surface has at least one sloped section; and an indent which extends the stacking surface beneath the extraction rollers in a direction opposite to a direction of movement of the media being extracted, so that the indent prevents binding of trailing edges of the media by accepting sections of the media which abut the trailing edges onto the stacking surface proximate to the indent.

BRIEF DESCRIPTION OF THE DRAWINGS

The aforementioned aspects and other features of the invention are described in detail in conjunction with the accompanying drawings, not necessarily drawn to scale, in which the same reference numerals are used throughout for denoting corresponding elements and wherein.

DETAILED DESCRIPTION OF THE PREFERRED EMBODIMENTS

Figure 3:
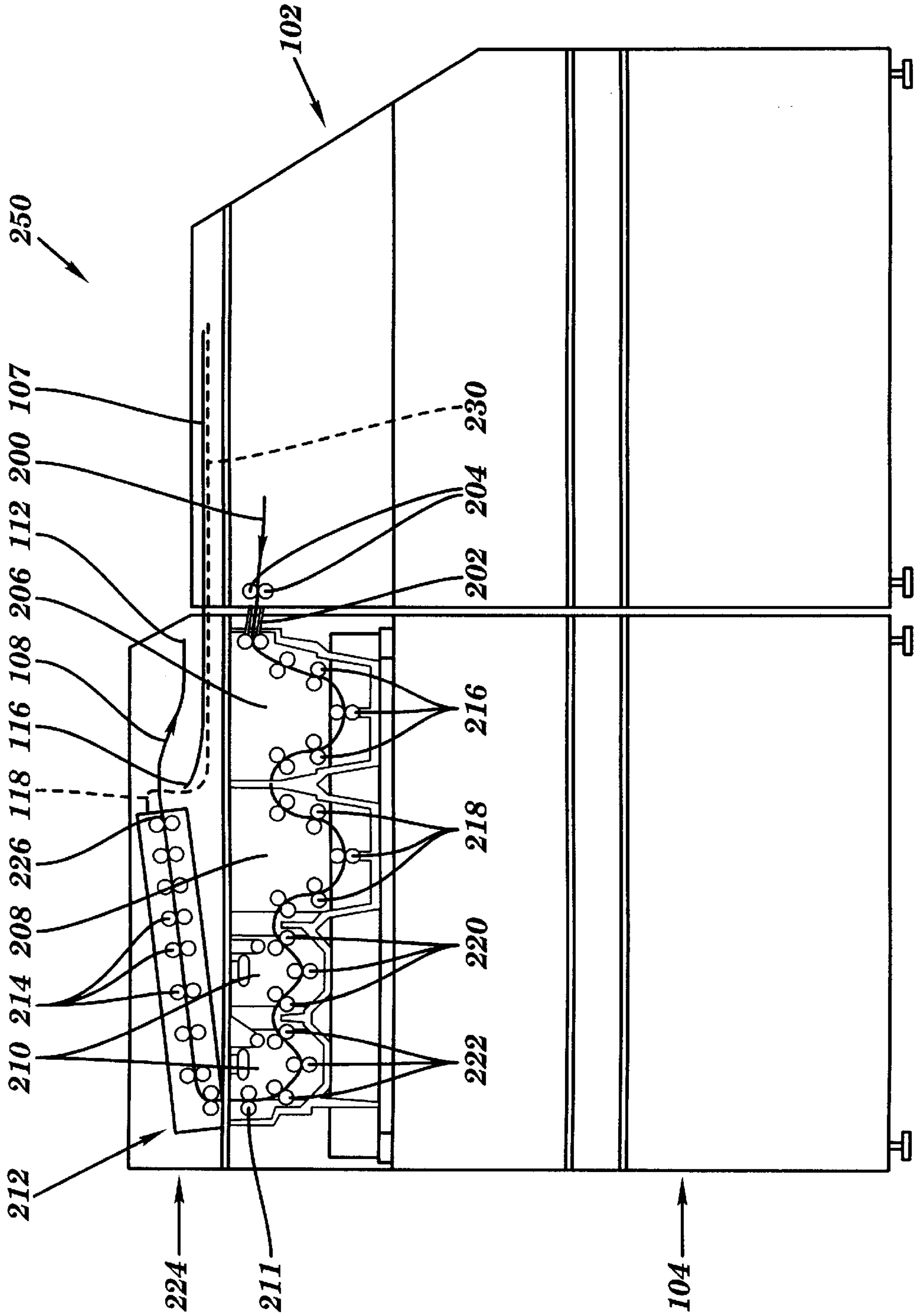
FIG. 3 PRIOR ART
FIG. 3 is a side view of the imagesetting system of FIG. 2, schematically illustrating the basic workflow of the image processor.
Figure 4:
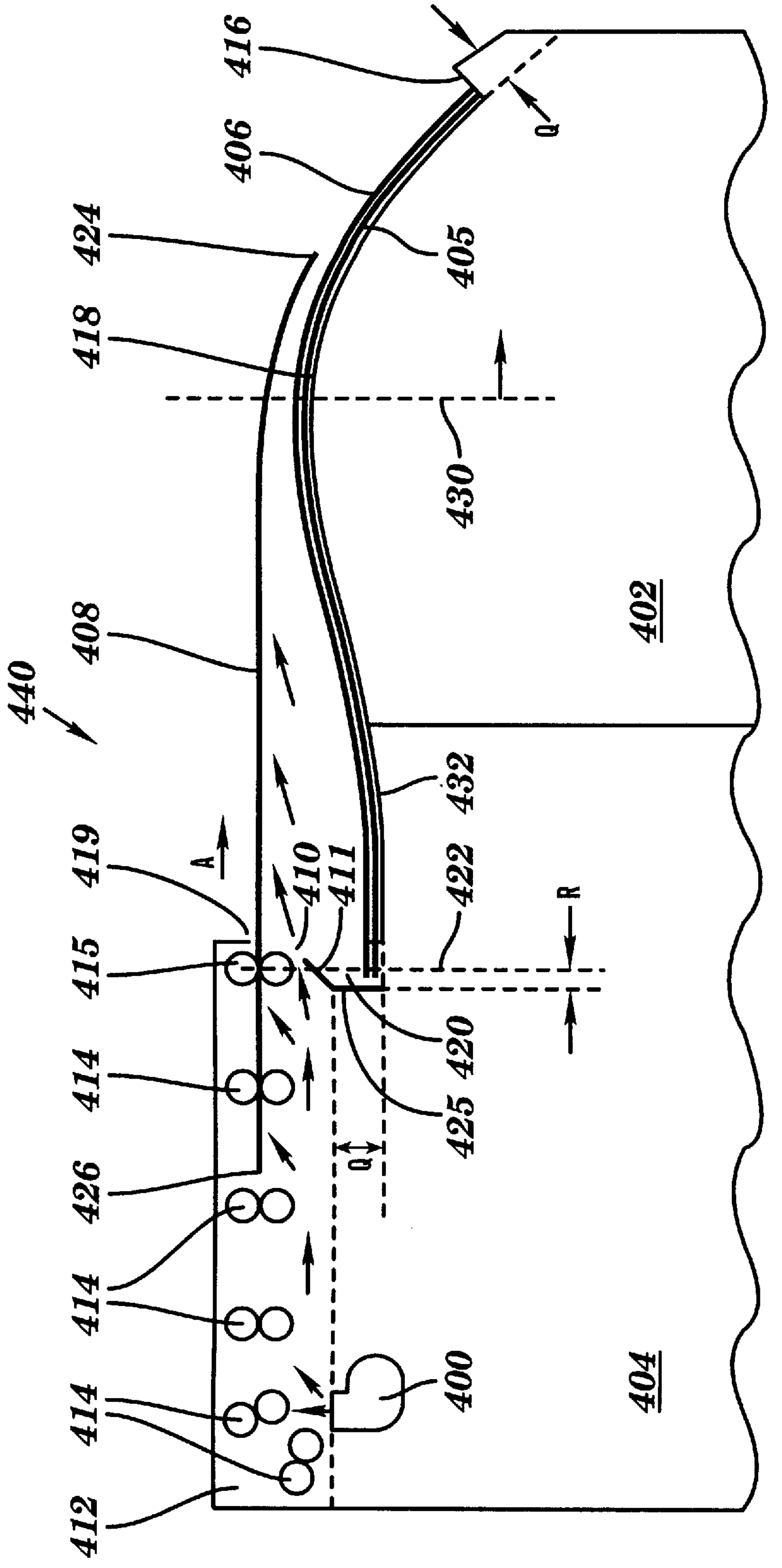
FIG. 4 is a partial side cutout view of an imagesetting system built in accordance with the principles of the invention.

An imagesetting system 440 which incorporates the principles of the present invention is illustrated in the partial side cutout view of FIG. 4. In the prior art as described with reference to FIG. 3, the enclosed dryer section 212 of the system 250 is a closed environment which includes: a plurality of transport rollers 214 for transporting the processed medium therethrough; and a fan (not shown) with an internal heater for circulating warm air throughout the enclosed dryer section 212. In this manner, the air circulation within enclosed dryer section 212 aids in drying the medium prior to exiting the enclosed dryer section 212 and stacking onto surface 230. The enclosed dryer section 212 is essentially air tight to prevent contamination of the machine and the media from dust and other foreign particles.

The dryer section 412 of FIG. 4 operates significantly differently from the previously described dryer sections of the prior art. Particularly, the dryer section 412 operates to dry and lift the underside of media after it has been extracted from any enclosed section of the imagesetting system. The dryer section 412 includes: transport rollers 414; a pair of extraction rollers 415; and an internally heated fan 400 which circulates warm air throughout the dryer section 412 for drying the media passing therethrough. The dryer section 412 also includes holes or a slot 410 to allow the warm air from the fan 400 to continue drying the underside of the extracted medium 408, as shown, prior to stacking. The arrow "A" signifies the direction in which the medium 408 is extracted from the dryer section of the processor. Although the preferred placement of the fan 400, as shown, allows for warm air to circulate throughout the dryer section 412 as well as to flow through the slot 410, the fan could be otherwise positioned as desired. For instance, the fan could be located so as to only blow air through the slot 410 onto the underside of the exiting medium 408, rather than circulating air throughout the dryer section 412. Alternatively, multiple fans could be employed, if desired.

In addition to ensuring adequate drying of the medium, the air blowing along the underside of the medium 408 tends to lift the medium 408 above the stacking surface 418 and/or 432, thereby minimizing any scratching or dragging of the exiting medium 408 along the surface 418, 432 or along the surface of a previously stacked sheet of medium 405 or 406. The fan 400 can be designed or adjusted so that the air pressure beneath the medium 408 will lift the medium while it is being stacked. In this way, friction is minimized as the medium is being stacked onto the surfaces 418, 432.

Figure 1:
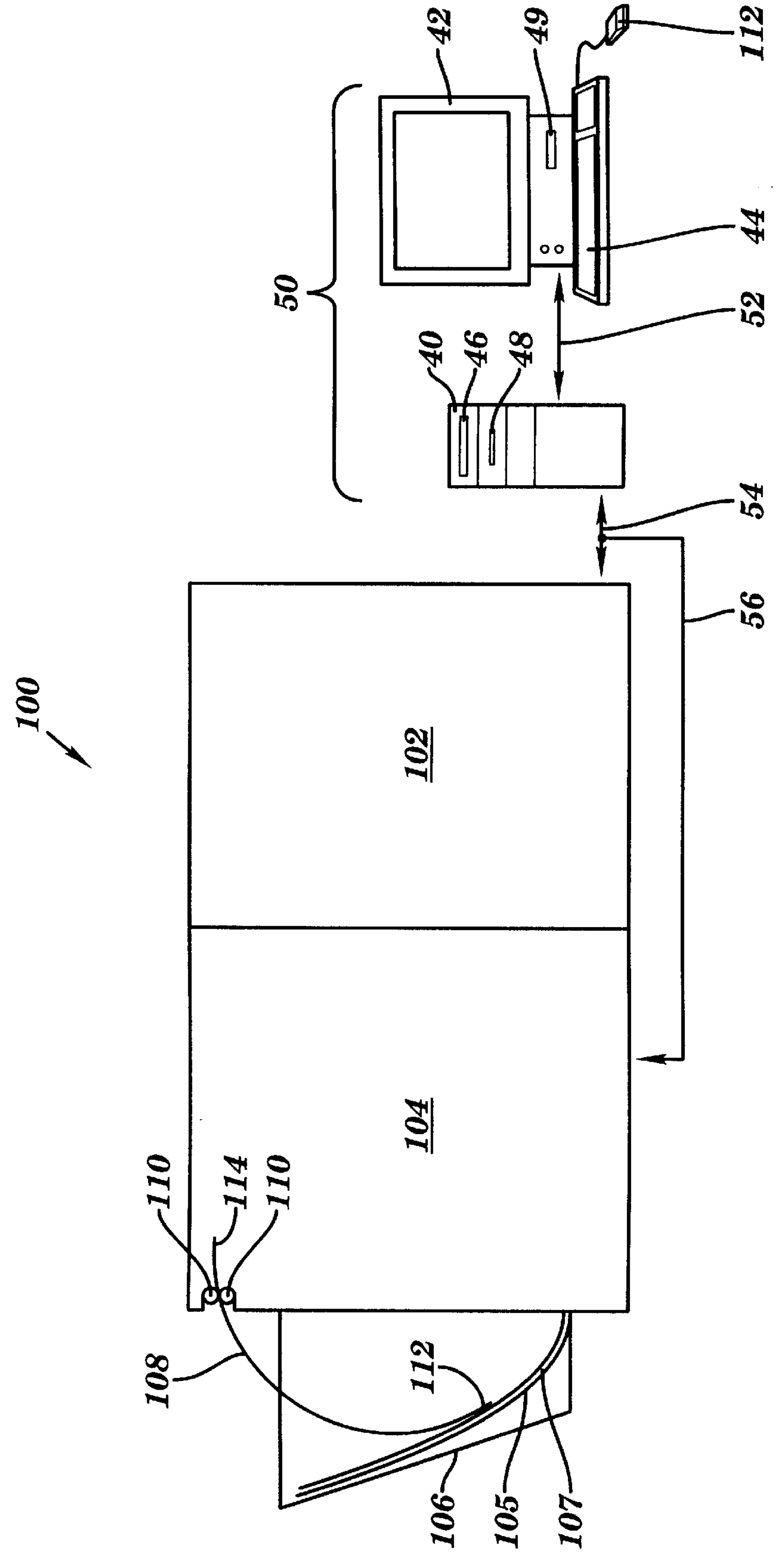
FIG. 1 PRIOR ART
FIG. 1 is a side diagrammatic view of one conventional imagesetting system.
Figure 2:
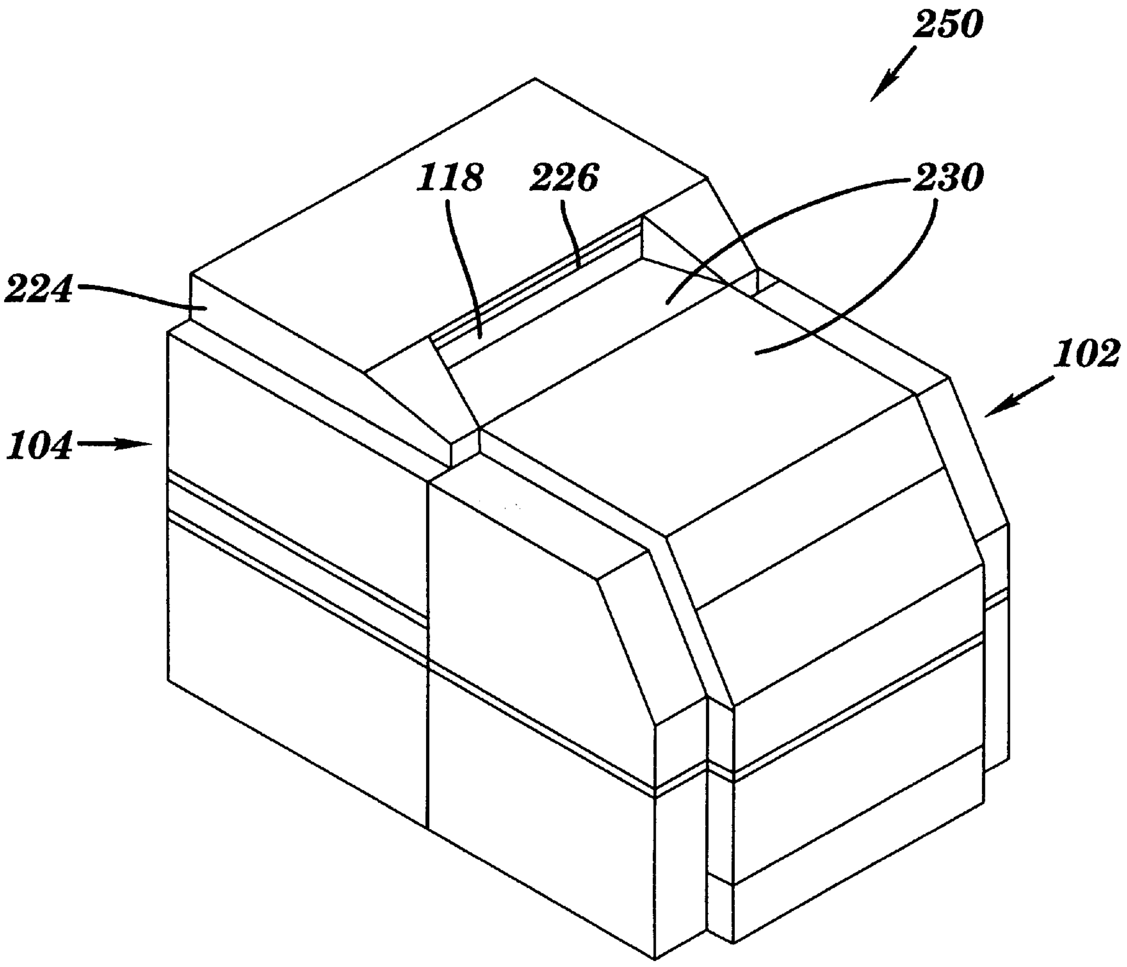
FIG. 2 PRIOR ART
FIG. 2 is a perspective view of another conventional imagesetting system.

In the prior art, the stacking of the imaged media occurs in a near vertical position in a basket 106 as shown in FIG. 1, or along a substantially flat, planar surface 230 in FIGS. 2 and 3. However, the preferred embodiment of the present invention provides a stacking surface having at least one sloped section or surface 418. This aids in the stacking of longer sheets of media by using gravity to help slide the leading edge 424 of the medium 408 down the sloping surface 418 with less friction than if the medium was stacked on a substantially horizontally planar surface such as surface 432. Another preferred embodiment includes both a convex curvilinear section 418 which corresponds to an upper external surface of the imagesetter 402, and a relatively flat surface 432 corresponding to an upper surface section of the processor 404. The curvilinear section of the stacking surface is convex in relation to cylindrical axis of the internal drum (not shown) within the imagesetter. The inclusion of the sloping section or convex curvilinear section 418 for stacking the media is beneficial in several accounts. First, as the leading edge 424 of the exiting medium 408 progresses, the downward slope of the surface 418 alleviates drag while facilitating a smooth, sliding action in stacking the media. Second, the surface 418 adjacent to the leading edge 424 of the exiting medium 408 ends at a stop (or stop surface) 416 which dictates a clean, concise end point at which all media sheets of an appropriate length will align during stacking. Third, the downward slope of the surface 418 allows gravity to aid in the stacking process without the use of additional mechanical devices. Fourth, the surface 418 is designed in such a manner so that in a preferred embodiment the force of the air flow (depicted by arrows) from fan 400 will be sufficient to keep the leading edge 424 of the exiting or extracted medium 408 from contacting either the surface 418 or the previously stacked sheet 406 until it reaches the downward slope of the surface 418. The downward slope is designated as the section of the surface 418 which is located to the right of the dotted line 430.

One end of the stacking surface 418, 432 is demarcated by the wall or stop 416, and the other end of the stacking surface 418, 432 is demarcated by the wall 425. The height of both the wall 425 and the stop 416 are preferably equal to some predetermined value "Q", which ideally corresponds to the height required to stack a whole roll of cut, imaged and processed media.

An indent 420 is built into the system 440 so that the stacking surface 432 is extended beneath the extraction rollers 415 in a direction opposite the direction of movement "A"of the medium 408 being extracted from the dryer section 412 of the processor 404. The indent 420 facilitates stacking of the media with the sections of the media abutting the trailing edges 426 stacked onto the stacking surface 432 proximate to the indent 420. The wall 425 is preferably offset a predetermined distance "R" back from the center line 422 of the extraction rollers 415. When the sheet of medium 408 is completely extracted from the dryer section 412, the trailing edge 426 of the sheet will gently fall along the tapered surface 411 into the indent 420 as shown for previously stacked sheets 405 and 406. The indent 420, coupled with the tapered surface 411, together prevent binding of the trailing edge 426 of the medium 408, and ensure even stacking of the media onto the stacking surfaces 418, 432. The tapered surface 411 extends from the vicinity of the extraction rollers 415, or alternatively from the vicinity of the extraction opening 419, to the wall 425. This feature is particularly useful when stacking sheets of different sizes. For instance, stacking alternate long and short media sheets results in the long sheets extending (with the help of the sloped surface 418) to the end stop 416, whereas the short sheets having leading edges which don't extend beyond the line 430 will be more prone to binding at the trailing edges. Of course, the indent 420 prevents such binding.

While this invention has been particularly shown and described with references to the above-described preferred embodiments, it is understood by those skilled in the art that various alterations, including equivalent structures and process steps, may be made therein without departing from the invention as defined by the appended claims.

What is claimed is:

1. An imagesetting system for imaging and processing an image onto media, the system comprising an imagesetter, a wet chemical processor, and a drying apparatus that dries the media after extraction from the processor and that blows air along an underside of the extracted media to support a leading edge of the media by air as the leading edge of the media is transferred from the drying apparatus to a downward sloped section of a curved receiving surface.

2. The system of claim 1 further comprising an end stop which demarcates one end of the at least one sloped section of the stacking surface and prevents the leading edges of the media from further advancement.

3. The system of claim 2 wherein the drying apparatus further operates to generate sufficient air pressure, by blowing air along the underside of the extracted media to lift the media and create an air cushion, thus delaying contact of leading edges of the media with the stacking surface.

4. The system of claim 3 wherein the media is extracted from the processor by extraction rollers.

5. The system of claim 4 further comprising an indent which extends the stacking surface beneath the extraction rollers in a direction opposite to a direction of movement of the media being extracted, said indent preventing binding of trailing edges of the media by accepting sections of the extracted media abutting the trailing edges onto the stacking surface proximate to the indent.

6. The system of claim 5 wherein the trailing edges of the media traverse from a vicinity of the extraction rollers, along a tapered surface, then to the stacking surface.

7. The system of claim 5 wherein said indent is offset by a predetermined distance from a centerline of the extraction rollers.

8. The system of claim 1 wherein said stacking surface is formed by one or more external surfaces of the imagesetter and the processor.

9. An imagesetting system comprising an imagesetter that transfers an image onto media, a wet chemical processor that processes the imaged media, a dryer section that dries the media by circulating air along an underside of the extracted media to support a leading edge of the media by air as the leading edge of the media is transferred from the drying apparatus to a downward sloped section of a curved stacking surface, and extraction rollers that extract the media from the dryer section, the extracted media being stacked on the curved stacking surface, the imagesetting system further comprising:

an indent which extends the stacking surface beneath the extraction rollers in a direction opposite to a direction of movement of the media being extracted, said indent preventing binding of trailing edges of the media by accepting sections of the extracted media abutting the trailing edges onto the stacking surface proximate to the indent.

10. The system of claim 9 wherein the trailing edges of the media traverse from a vicinity of the extraction rollers, along a tapered surface, then to the stacking surface.

11. The system of claim 9 wherein said indent is offset by a predetermined distance from a centerline of the extraction rollers.

12. An imagesetting system comprising an imagesetter that transfers an image onto media, a wet chemical processor that processes the imaged media, a dryer section that dries the media by circulating air thereabout, and extraction rollers that extract the media from the dryer section, the imagesetting system further comprising:

an apparatus that blows air along an underside of the extracted media to support a leading edge of the media by air as the leading edge of the media is transferred from the drying apparatus to a downward sloped section of a curved stacking surface on which the extracted, dried media is stacked, said stacking surface being formed by one or more external surfaces of the imagesetter and the processor; and an indent which extends the stacking surface beneath the extraction rollers in a direction opposite to a direction of movement of the media being extracted, said indent preventing binding of trailing edges of the media by accepting sections of the media abutting the trailing edges onto the stacking surface proximate to the indent.

13. The system of claim 12 wherein, when the media is extracted from the extraction rollers, the trailing edges of the media traverse along a tapered surface so that sections of the media abutting the trailing edges are stacked onto the stacking surface proximate to the indent.

14. The system of claim 12 wherein said indent is offset by a predetermined distance from a centerline of the extraction rollers.

15. A method for drying media extracted form an imagesetting system, comprising the steps of:

blowing air along an underside of the extracted media to dry the media; and generating sufficient air pressure along the underside of the media to support a leading edge of the media by air as the leading edge of the media is transferred to a downward sloped section of a curved receiving surface.

16. A method for stacking media extracted from an imagesetting system, comprising the steps of:

providing a stacking surface having at least one sloped section for stacking extracted media;

preventing binding of leading edges of the media by blowing air along an underside of the extracted media to support a leading edge of the media by air as the leading edge of the media is transferred to a downward sloped section of a curved stacking surface; and preventing binding of trailing edges of the media by providing an indent which extends the stacking surface in a direction opposite to a direction of movement of the media being extracted, said indent preventing binding of trailing edges of the media by accepting sections of the extracted media abutting the trailing edges onto the stacking surface proximate to the indent.

17. The method of claim 16 wherein the step of preventing binding of the trailing edges of the media further comprises providing a tapered surface between extraction rollers for extracting the media and the stacking surface.

18. A method for drying and stacking media extracted from an inagesetting system, comprising the steps of:

providing a stacking surface having at least one sloped section for stacking the extracted media;

blowing air along an underside of the extracted media to dry the extracted media and to generate sufficient air pressure along the underside of the extracted media to support a leading edge of the media by air as the leading edge of the media is transferred to a downward sloped section of a curved stacking surface; and providing an indent which extends the stacking surface in a direction opposite to a direction of movement of the media being extracted, for preventing binding of trailing edges of the media by accepting sections of the extracted media abutting the trailing edges onto the stacking surface proximate to the indent.

* * * * *